(12) United States Patent
Ricketts

(10) Patent No.: US 7,720,214 B2  
(45) Date of Patent: May 18, 2010

(54) CALL CENTER STUDY METHOD AND SYSTEM

(75) Inventor: John Arthur Ricketts, Clarendon Hills, IL (US)

(73) Assignee: International Business Machines Corporation, Armonk, NY (US)

( * ) Notice: Subject to any disclaimer, the term of this patent is extended or adjusted under 35 U.S.C. 154(b) by 1487 days.

(21) Appl. No.: 11/062,686

(22) Filed: Feb. 22, 2005

(65) Prior Publication Data

US 2006/0188085 A1    Aug. 24, 2006

(51) Int. Cl.
*H04M 3/523* (2006.01)

(52) U.S. Cl. .............................. 379/265.02; 379/88.03; 379/196; 379/212.01; 379/265.06; 379/266.1; 705/11; 707/1; 714/38

(58) Field of Classification Search ............ 379/265.06, 379/88.03, 196, 210.01, 212.01, 265.02, 379/266.1; 705/11; 707/1; 714/38

See application file for complete search history.

(56) References Cited

U.S. PATENT DOCUMENTS

| | | | |
|---|---|---|---|
| 5,465,286 A | 11/1995 | Clare et al. | |
| 5,615,332 A * | 3/1997 | Yamamoto | 714/38 |
| 5,818,907 A | 10/1998 | Maloney et al. | |
| 6,353,667 B1 * | 3/2002 | Foster et al. | 379/265.05 |
| 6,526,397 B2 * | 2/2003 | Chee et al. | 707/1 |
| 6,665,395 B1 * | 12/2003 | Busey et al. | 379/265.09 |
| 6,707,904 B1 | 3/2004 | Judkins et al. | |
| 6,711,253 B1 | 3/2004 | Prabhaker | |
| 6,711,256 B1 * | 3/2004 | O'Neil | 379/266.1 |
| 6,868,152 B2 * | 3/2005 | Statham et al. | 379/265.02 |
| 7,155,001 B2 * | 12/2006 | Tiliks et al. | 379/196 |
| 7,317,787 B2 * | 1/2008 | Crockett et al. | 379/88.03 |
| 7,526,079 B2 * | 4/2009 | Mello | 379/212.01 |
| 2001/0032120 A1 * | 10/2001 | Stuart et al. | 705/11 |
| 2005/0071178 A1 * | 3/2005 | Beckstrom et al. | 705/1 |
| 2006/0002538 A1 * | 1/2006 | Dezonno | 379/210.01 |

FOREIGN PATENT DOCUMENTS

JP    2003298748 A    10/2003

* cited by examiner

*Primary Examiner*—Gerald Gauthier  
(74) *Attorney, Agent, or Firm*—John Pivnichny (57) ABSTRACT

Studies of call center activities are performed by using a tool having timer buttons for timing call activities during a live or recorded call. Code values are assigned to specific activities and activity subtypes. The calls are assigned to a plurality of reviewers who gather data using the tool. Reviewer data is consolidated into a master database. The data is normalized with agent performance ratings. The normalized data is analyzed statistically to determine leverage points for improvement.

1 Claim, 11 Drawing Sheets

FIG.1

Call events:
- Prior self-service: ?
- Activity during hold: ?
- Reason for silence: ?
- Transfer from: ?
- Transfer to: ?
- Transfer type: ?
- Transfer attempts: ?
- Issues/tool-based roadblock ?
- ☐ Agent recapped the agreement
- ☐ Agent advised call of wait time for transfer
- ☐ Agent told caller about self-help options
- ☐ Caller terminated call before resolution Customer satisfaction:         ?
    Source of rating: ?
- ☐ Caller can hear clearly & understand
- ☐ Agent gives his/her name
- ☐ Agent understands question/problem
- ☐ Agent has correct account information
- ☐ Agent offers to assist with other issues
- ☐ Issue resolved on first call Customer value:         ?
- ☐ Fact Finding
- ☐ Bridge attempt
- ☐ Recommendation
- ☐ Sale completed         ?

Take out time:         seconds:
| | |
|---|---|
| ☐ Agent training | 0.0 |
| ☐ Store training | 0.0 |
| ☐ Call scripting | 0.0 |
| ☐ Agent experience | 0.0 |
| ☐ Better system | 0.0 |
| ☐ Idle chatting | 0.0 |
| ☐ Agent empowerment | 0.0 |
| ☐ Company policies | 0.0 |
| ☐ System unavailable | 0.0 |
| ☐ Other | 0.0 |
| Total | 0.0 |

22 — (pointing to Issues/tool-based roadblock line)

CALL CENTER STUDY METHOD AND SYSTEM

TECHNICAL FIELD

The present invention generally relates to call center operational methods and systems. More particularly, the present invention pertains to a method and system for studying and analyzing the operation of a call center to identify a baseline level of performance and areas for performance improvement.

BACKGROUND OF THE INVENTION

Call centers are used to provide services of a wide variety. For example, a company may use a call center to service customers around the world and around the clock.

In order to manage and improve the efficiency or performance of a call center, supervisors and others monitor the telephone calls. Various methods of monitoring and gathering data during monitoring have been devised to assist in this essential management task.

Clare et al. in U.S. Pat. No. 5,465,286 describe a system for supervising an automatic call distribution (ACD) telephone system. The ACD routes incoming calls to agents. However, certain agents may be unavailable to take a call due to unexpected delays in handling another call, change of shift or the like. Calls are therefore queued. A supervisor can monitor the size of the queues, length of time the oldest ACD call has been waiting to be answered or other call data and take action to assign additional agents to take calls, shift agents from other groups, shift agents from making outbound calls to taking incoming ACD calls. Clare describes a system for displaying agent activities, agent data, and agent status on a map representation and in a directory listing. The system also predicts pending abandonment of queued calls and the potential financial impact of pending loss of calls.

Maloney et al. in U.S. Pat. No. 5,818,907 describe a method and system for monitoring the performance of a call center agent by determining a number of calls or length of time within an interval for such monitoring. The system automatically records the performance of the agent at this time with or without notifying the agent. A supervisor may later listen to and annotate the recording.

Stuart et al. in US Published Application US2001/0032120 A1 describe a method for evaluating the efficiency of a call agent by collecting call handling data for that agent, collecting cost data for that agent, and computing a cost based performance indicator from the handling data and cost data.

Masami et al. in their abstract of Japanese published patent application JP2003298748A describe a call center analyzing system. A person in charge of analysis has a terminal with a data storing unit and an analysis database. The data storing unit collects telephone call information and telephone reception information and stores these in the database as call center information. The terminal analyzes this information. Using this system, the person in charge of analysis can quickly analyze the call center information.

Judkins et al in U.S. Pat. No. 6,707,904 describe a method and system for collecting and reporting information on a call center operation, to a supervisor. A supervisor computer is connected to an ACD server and a structured query language (SQL) server having a database for call center statistics. At predetermined time intervals, the system automatically detects using the ACD server whether an agent is taking a call, completed a call but not yet indicated availability to take another call (wrap time) and the like, and forwards this to the supervisor computer. Real time reports are generated and displayed to a supervisor. At predetermined time intervals, statistical data related to agents and call center operation is sent from the SQL server and database to the supervisor computer to obtain historical reports of call center operation.

Prabhaker et al. in U.S. Pat. No. 6,711,253 describe a system for analyzing call center operations data. The system retrieves the data from a memory unit and processes it to determine agent composition and occupancy information. Agent groups that share a common skill are identified. The system generates reports indicating the agent composition and occupancy information.

Despite the above developments, there remains a need for improved methods of studying the operation of a call center and identifying areas for productivity improvements. It is believed that such methods would constitute a significant advancement in the call center management arts.

OBJECTS AND SUMMARY OF THE INVENTION

It is therefore a principal object of the present invention to enhance the call center management arts by providing an improved method of conducting a call center study.

It is another object to provide such a method wherein enhanced study operational capability is possible.

It is a further object to provide a system which can provide improved call center study capability.

It is yet another object to provide a computer program product and services offering wherein such improved study capability is possible.

These and other objects are attained in accordance with one embodiment of the invention wherein there is provided a method of conducting a call center study, comprising the steps of providing a tool for capturing call data including time data of specific activities from live calls or recorded calls, identifying the specific activities applicable to a specific client or study, and assigning code values thereto in the tool, assigning the calls to a plurality of reviewers, gathering data from the calls by the plurality of reviewers, consolidating the gathered data from the plurality of reviewers into a master database, normalizing the time data in the master database with agent performance ratings, and analyzing the normalized time data statistically.

In accordance with another embodiment of the invention, there is provided a system for conducting a call center study, comprising a tool for capturing call data including time data of specific activities from live calls or recorded calls, means for identifying the specific activities applicable to a specific client or study, and assigning code values thereto in the tool, means for assigning the calls to a plurality of reviewers, means for gathering data from the calls by the plurality of reviewers, means for consolidating the gathered data from the plurality of reviewers into a master database, means for normalizing the time data in the master database with agent performance ratings, and means for analyzing the normalized time data statistically.

BEST MODE FOR CARRYING OUT THE INVENTION

For a better understanding of the present invention, together with other and further objects, advantages and capabilities thereof, reference is made to the following disclosure and the appended claims in connection with the above-described drawings.

Figure 1:
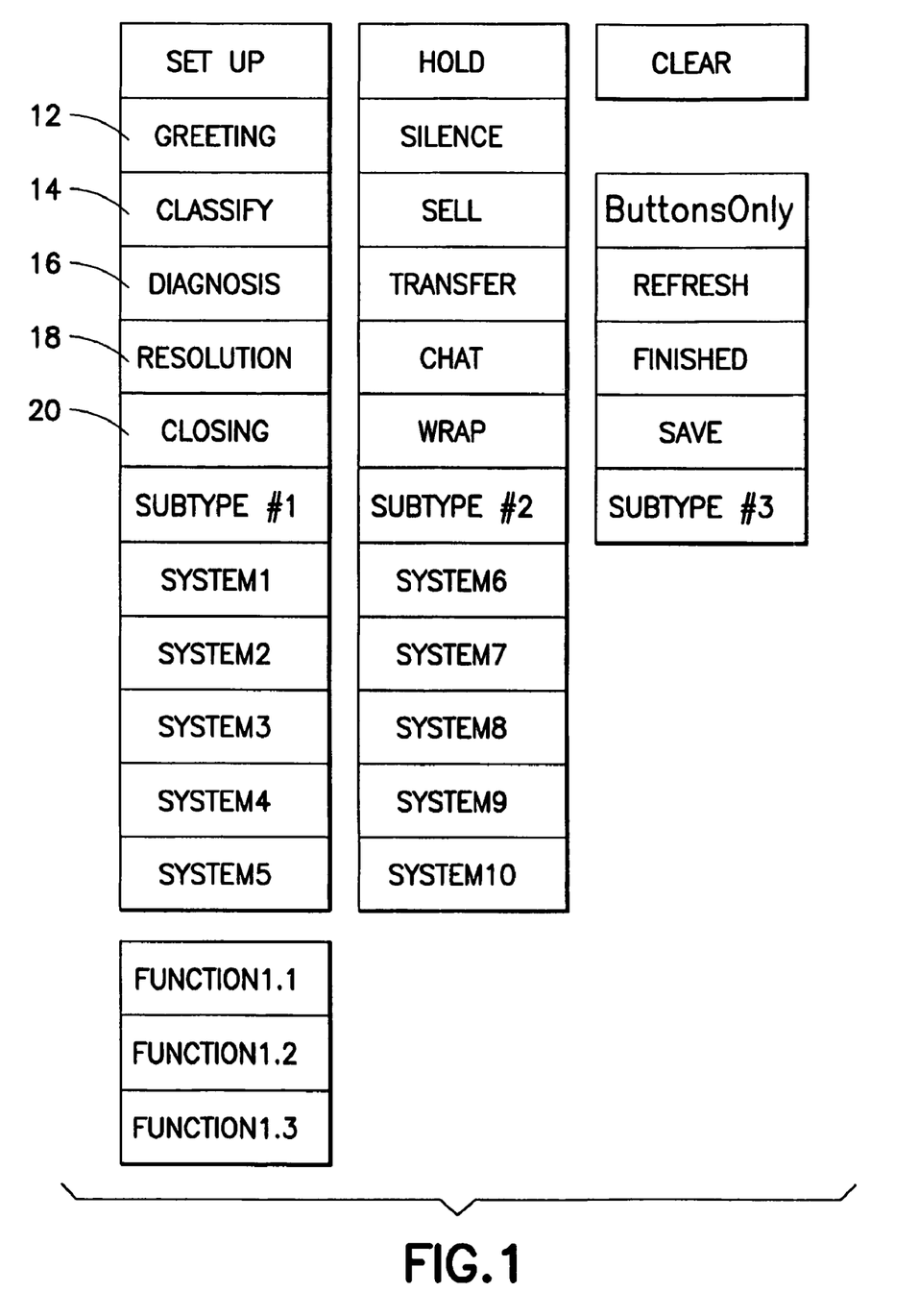
FIG. 1 shows an arrangement of call timer buttons.

In FIG. 1, there is shown call timer controls or buttons 12, 14, 16, 18, 20 which appear on a display screen of a tool for measuring calls and gathering call related data during a call center study conducted in accordance with the present invention. A person monitoring a call or a recording of a call may click on a button to start a timer. For example, when the person determines that the call activity is a greeting, button 12 may be selected. When the call progresses to another activity, such as classify, diagnosis, resolution, or closing, buttons 14, 16, 18, or 20 respectively can be selected to start another timer and stop the greeting timer. In some embodiments, additional buttons may be used to select a call activity subtype, starting a second timer to run concurrently with the main activity timer.

Additional buttons may be included to capture other call related data such as which call center is handling the call, the customer segment, customer value, language used, descriptors, such as reason for call, transfers in and out, automated response systems employed, and caller satisfaction.

Figure 2:
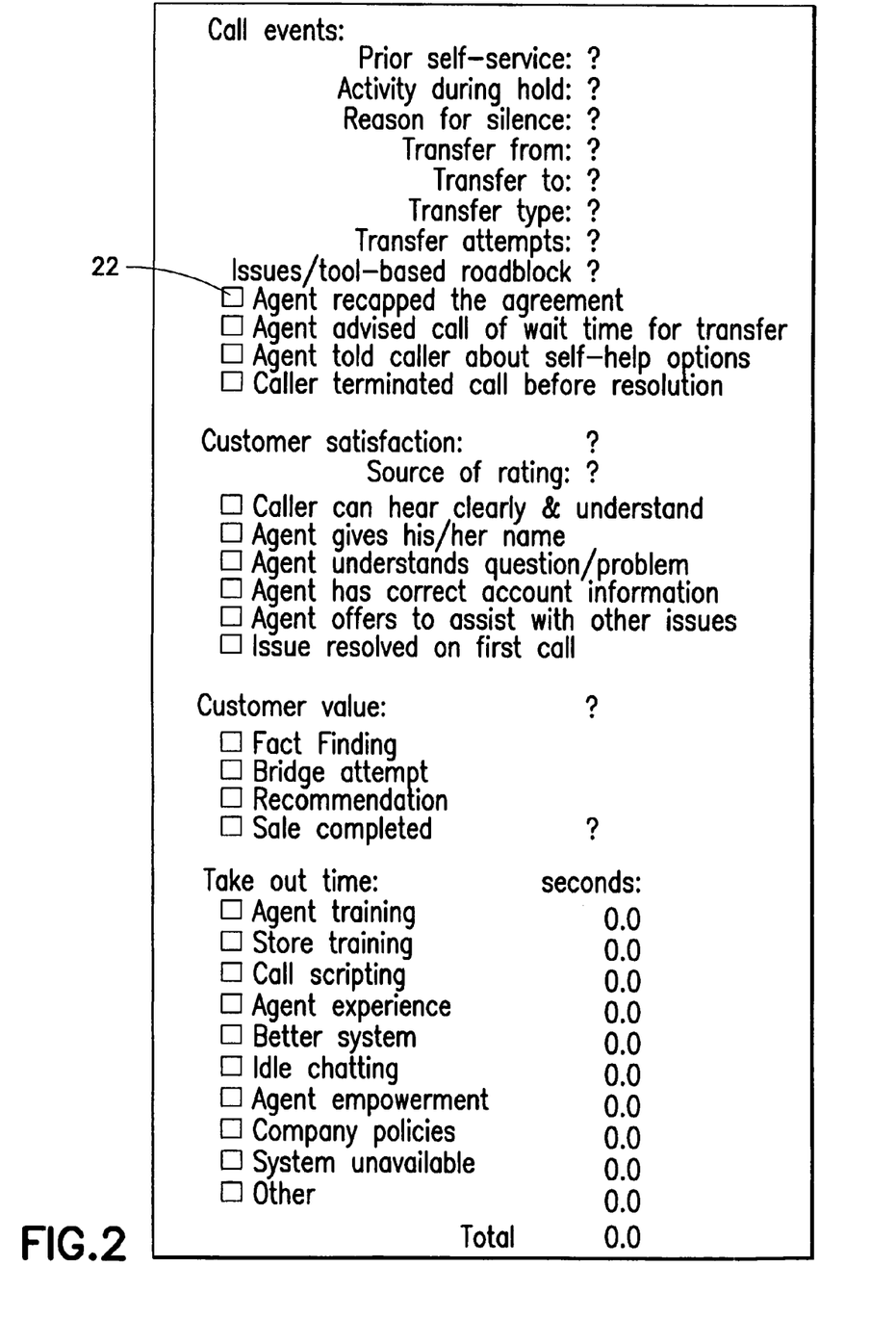
FIG. 2 shows a selection listing of dynamic information.

In FIG. 2, there is shown check boxes 22 on a display screen which the person gathering call data may use to capture details of a call.

A tool for capturing timed data of specific activities from live calls or recorded calls may comprise any type of computing device having a display screen capable of displaying and allowing a person or reviewer to select the timer buttons or check boxes of FIGS. 1 and 2 respectively.

Figure 3:
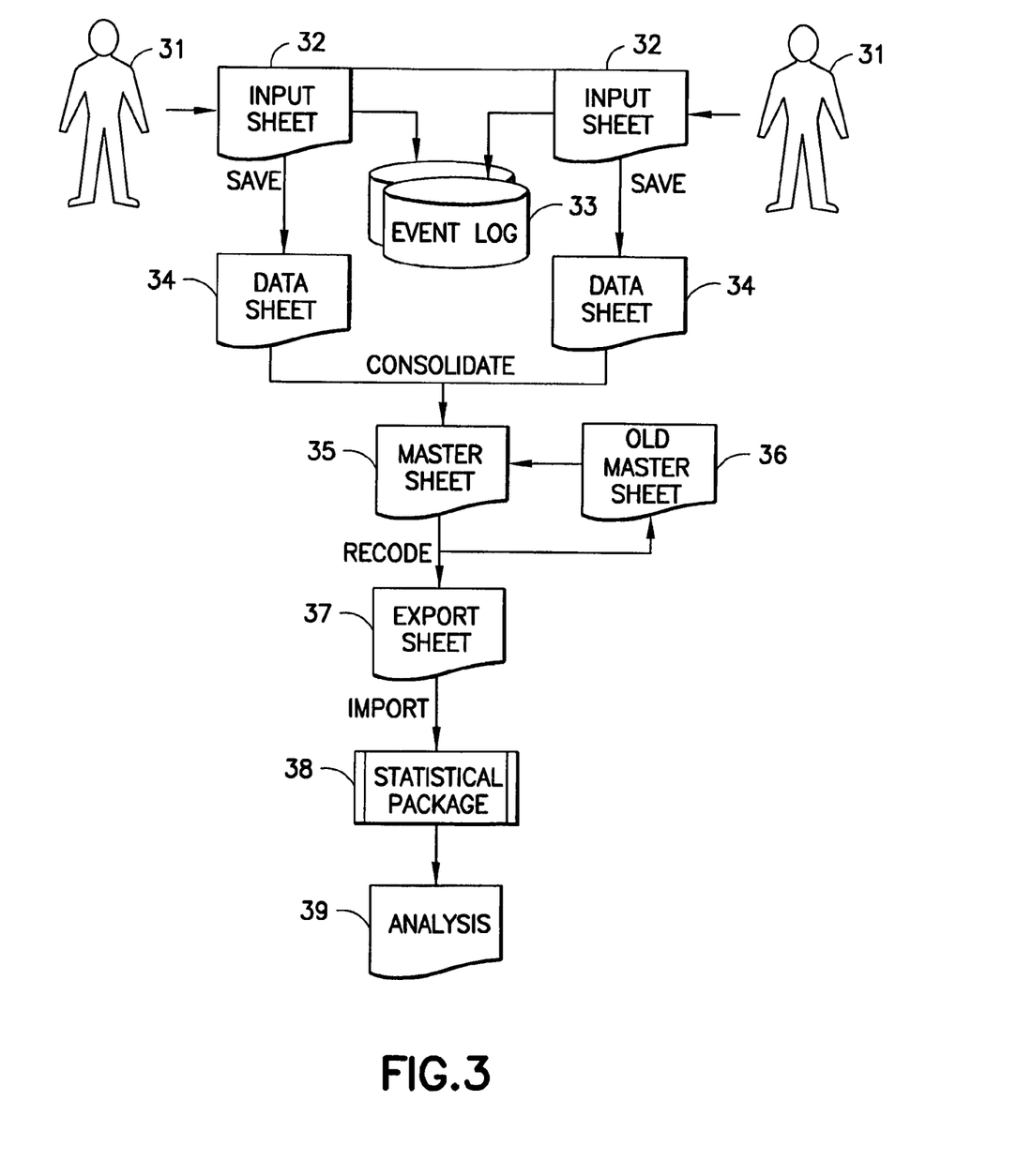
FIG. 3 is a flowchart depicting steps performed in accordance with the present invention.

Referring now to the flowchart of FIG. 3, reviewers 31 use the tool just described to capture call data. Specific activities applicable to a specific client or study have been previously identified and selector buttons made available on the display screen of the computing device. Code values are assigned in the tool to such specific activities to aid in efficiently collecting and recording the desired call data.

Callers are assigned to a plurality of specific reviewers 31 who gather the call data on input sheets 32. The term input sheet shall be taken to include an electronic spreadsheet or any other type of electronic sheet for entering or capturing call data in the computing device. Input sheets are recorded in the event log 33 and also saved as data sheets 34.

In step 35, the data sheets are consolidated into a master database which may be any type of database known in the arts such as a relational database, a hierarchical database, or a spreadsheet database. For example, in some embodiments, data sheets 34 may be consolidated into a master spreadsheet which may comprise updating or recording old master sheet 36.

In step 37, call data is exported from master database 35 for use by statistical package 38 where the exported call data is imported. Statistical package 38 may be used to normalize call time data with agent performance ratings, for example, to remove variations due to different agent performance levels. Statistical package 38 may also be used to assist in analyzing the normalized data in step 39. Example of such analyzing are described below in conjunction with descriptions of FIGS. 4-11.

Figure 4:
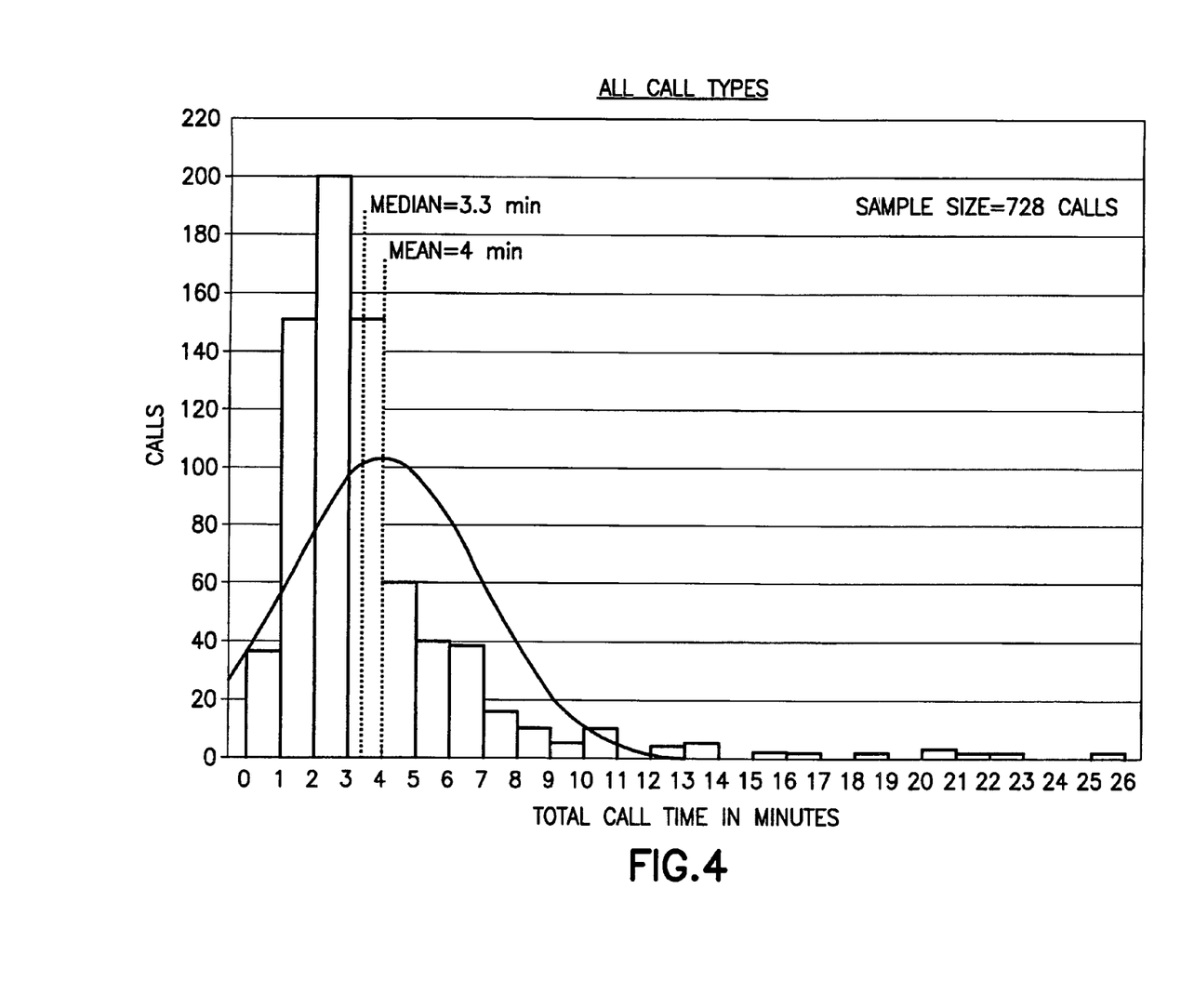
FIG. 4 is a frequency distribution of call times.

In FIG. 4, there is shown a frequency distribution of call times in minutes for a sample of 728 calls. Statistical analysis shows in this case that about 66 percent of the calls lie below the mean of four minutes, contrary to many clients' expectations. Leverage points (places to change a small subset of calls to have a significant impact on the average) are therefore in the right tail.

Figure 5:
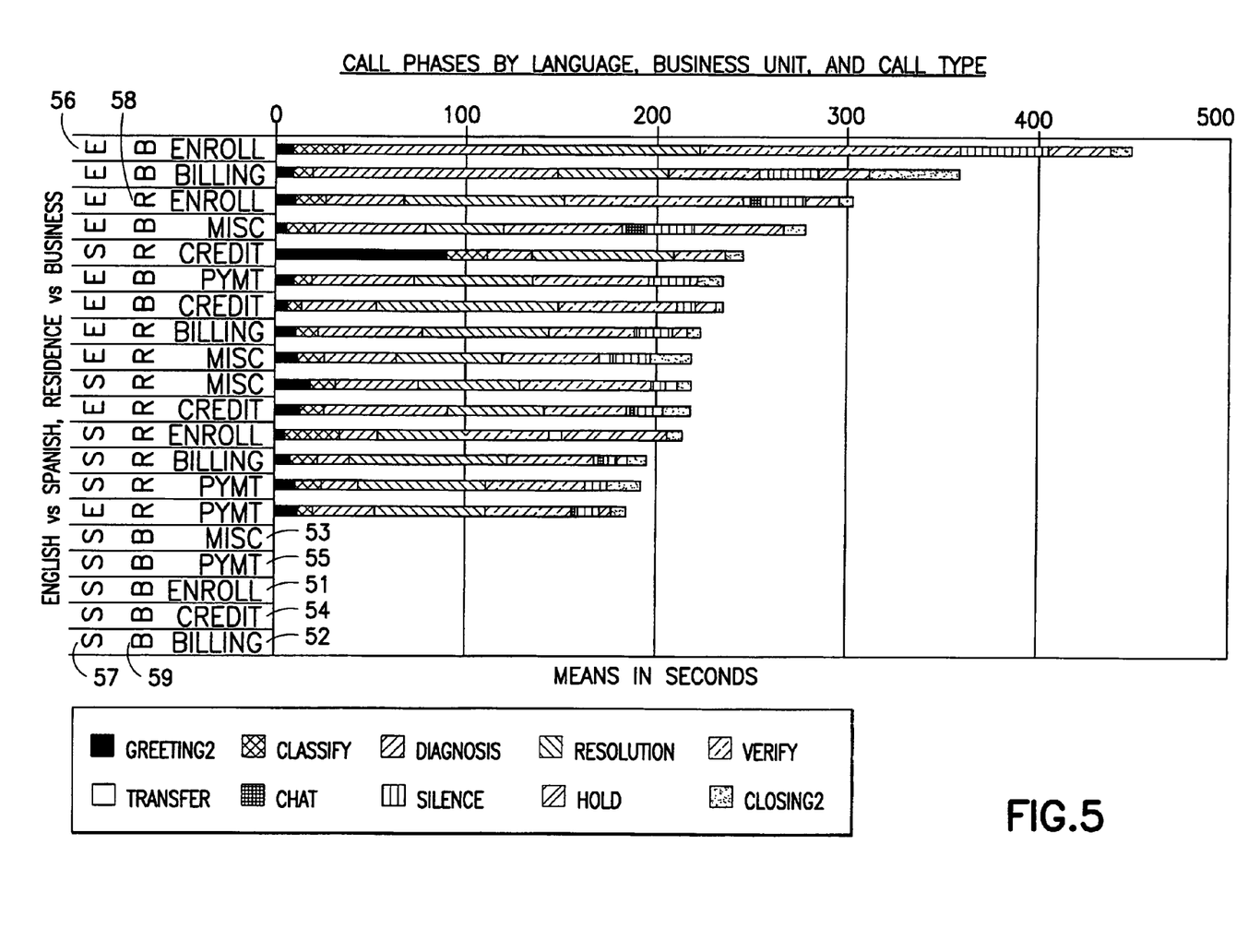
FIG. 5 is a Pareto chart with breakdown of call activities.

FIG. 5 shows another type of analysis performed in step 39. A bar chart of activity types or phases for 5 call types, e.g., enroll 51, billing 52, miscellaneous 53, credit 54, and payment 55 are shown. Each of the 5 call types may be conducted in either the English 56 or Spanish 57 language. This particular study involved calls from North America. The calls may be received from either a residence 58 or a business 59, making a total of 20 categories shown in FIG. 5. Note that there were not enough calls from businesses in the Spanish language to provide statistically significant data for this call type combination. The combinations are sorted by mean of total call time for analysis purposes. For example, enroll calls from businesses in the English language took the longest time, and significantly longer than enroll calls from residences in either English or Spanish. From such statistical analysis, one could direct efforts to reduce the total call time of such calls.

Figure 6:
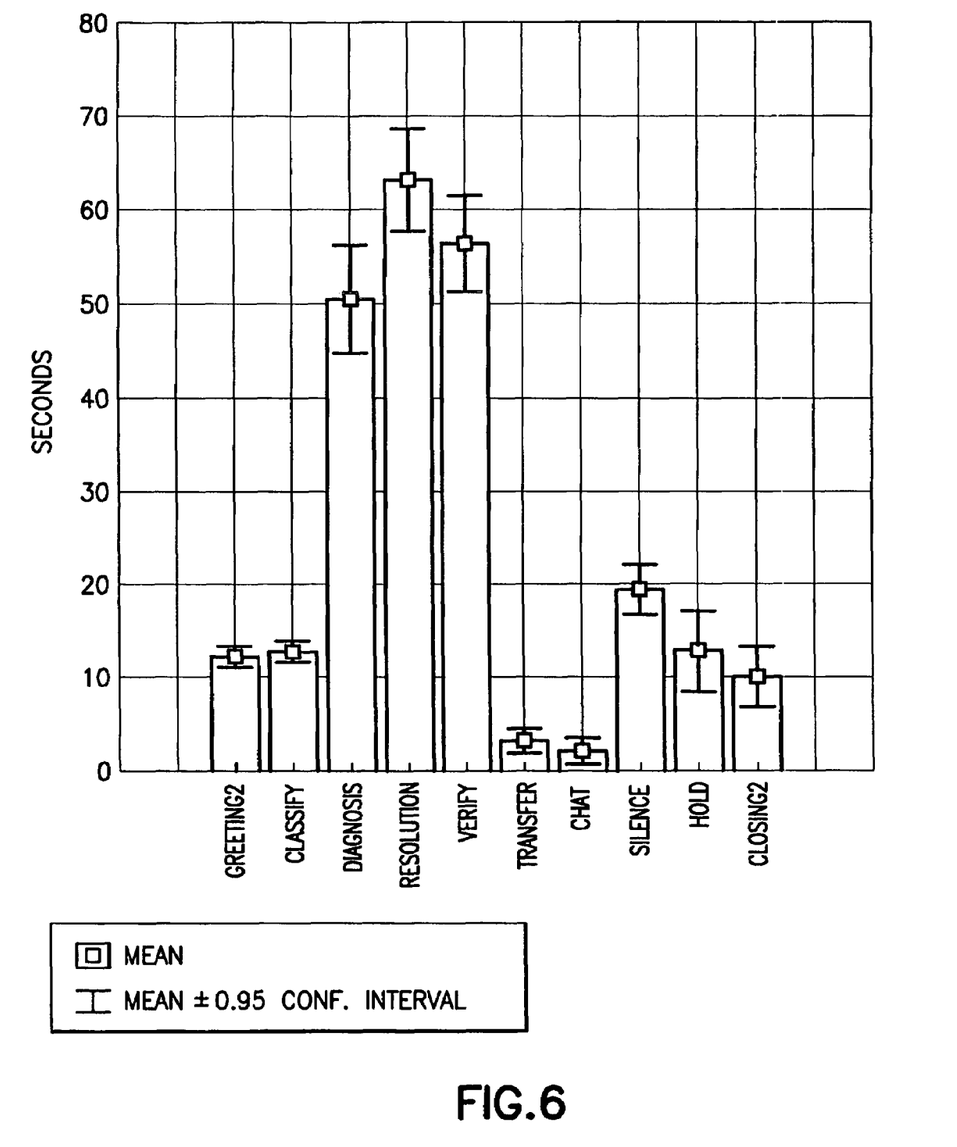
FIG. 6 shows confidence intervals around the mean time of call activities.

In FIG. 6, there is shown a chart of mean times of call activities including confidence intervals around the means. Such confidence intervals can be obtained from analysis of variance calculations using statistical package 38. Such confidence intervals can be used to distinguish significant from non significant differences. For example, the resolution call activity definitely takes longer than the diagnosis call activity but is not necessarily longer than the verify call activity despite the difference in the mean time of each.

Figure 7:
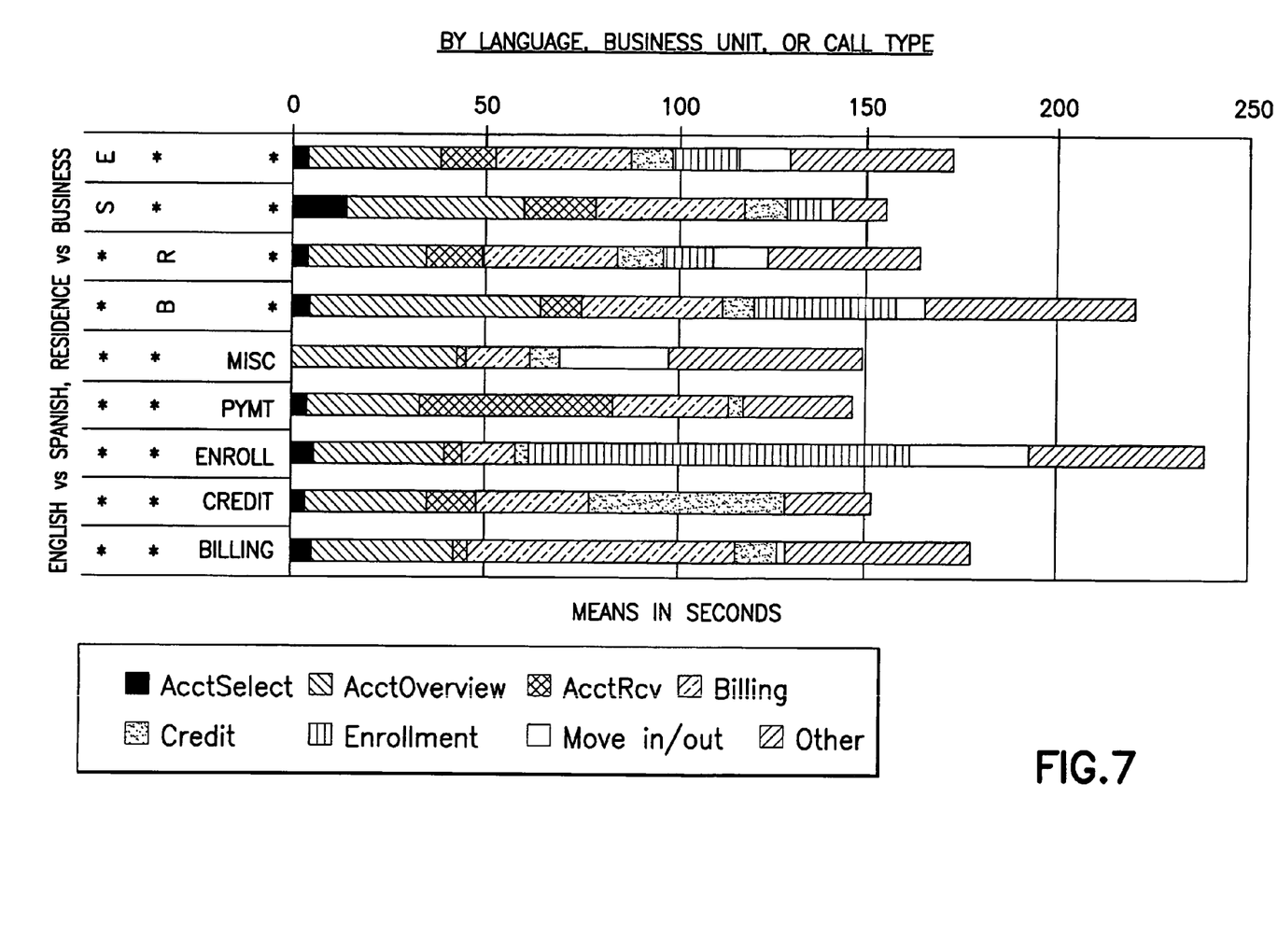
FIG. 7 is a breakdown of system and function usage.

FIG. 7 shows an example analysis of call data as in FIG. 5, but arranged by language, business or residence, and call type. In FIG. 7, an asterisk, *, denotes "for all" or total. For example, the first bar graph depicts all English language calls, for all business and residence calls and for all five types. Bars of various shades depict call activity subtypes as given by the key at the top of FIG. 7. Enrollment call types spend the most time on enrollment call activity subtype, however, on average, some time is also taken for, e.g., billing and credit.

Figure 8:
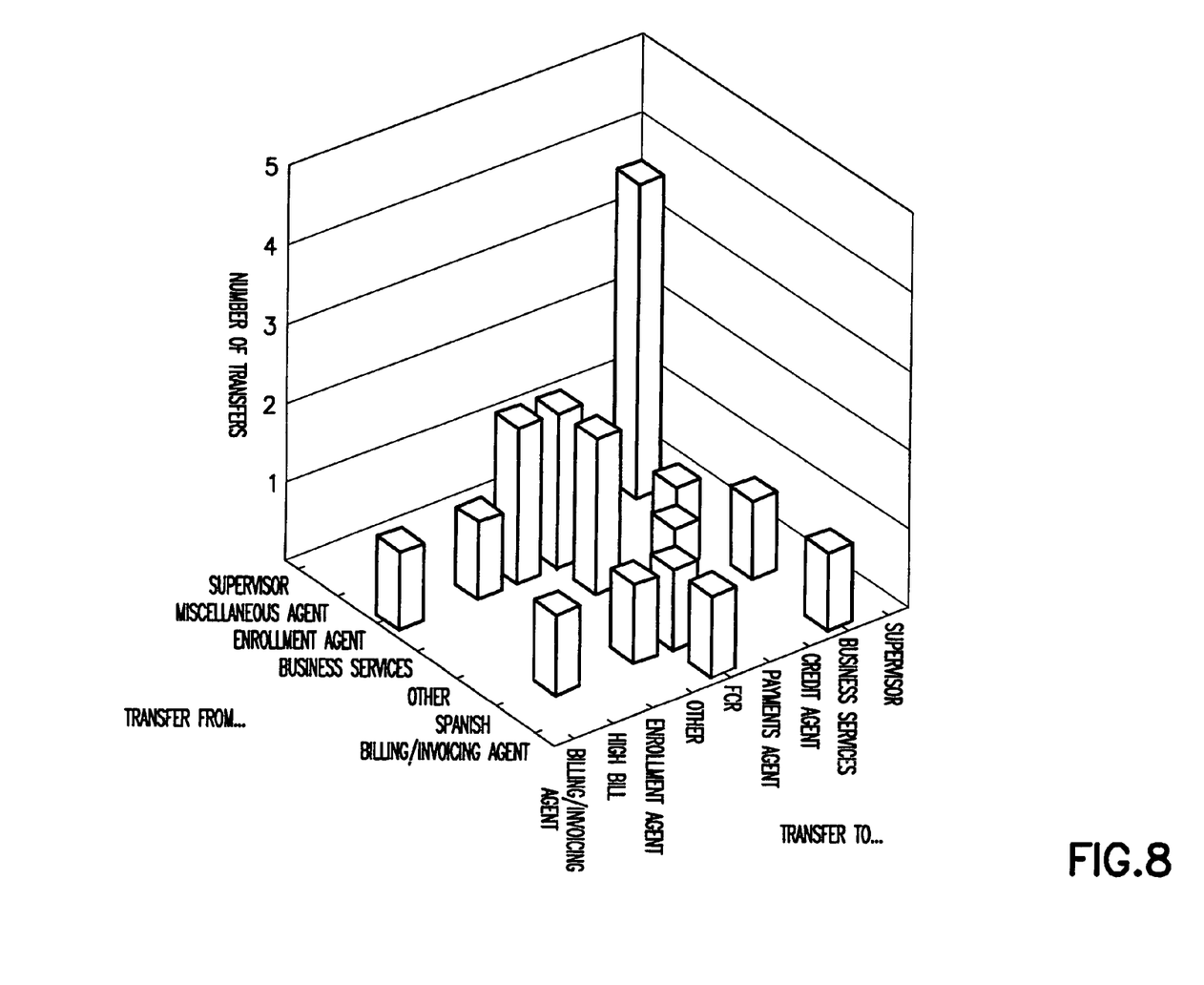
FIG. 8 is an analysis of frequency of transfers.

In FIG. 8, there is shown a three dimensional frequency distribution of call transfers. For example, a transfer from a miscellaneous agent to business services occurs most frequently.

Figure 9:
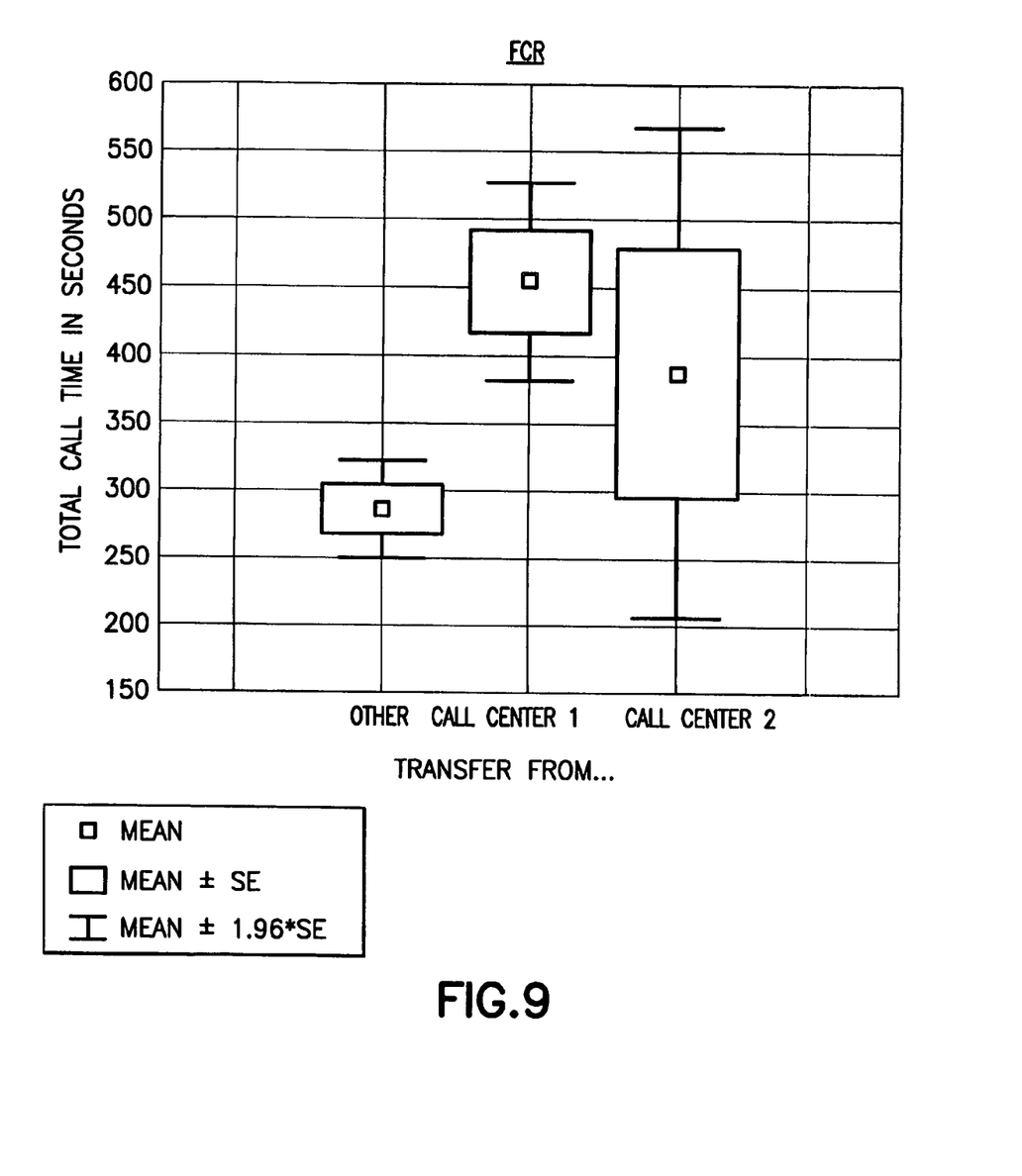
FIG. 9 is a comparison of total call time by call center showing standard error of means.

An analysis of first call resolution (FCR) calls by call center is shown in FIG. 9. The mean call time for three call centers is shown along with a box denoting the mean plus and minus one standard error, and whiskers denoting the mean plus and minus 1.96 standard errors. From the analysis in FIG. 9, one could conclude that there is no significant difference in the total call time between Call Center 1 and Call Center 2. However, the "other" call center seems to be completing calls in less time. Improvement efforts may thus be directed to learning how the "other" call centers complete calls in less time or why Call Center 1 and Call Center 2 take longer to complete FCR calls.

Figure 10:
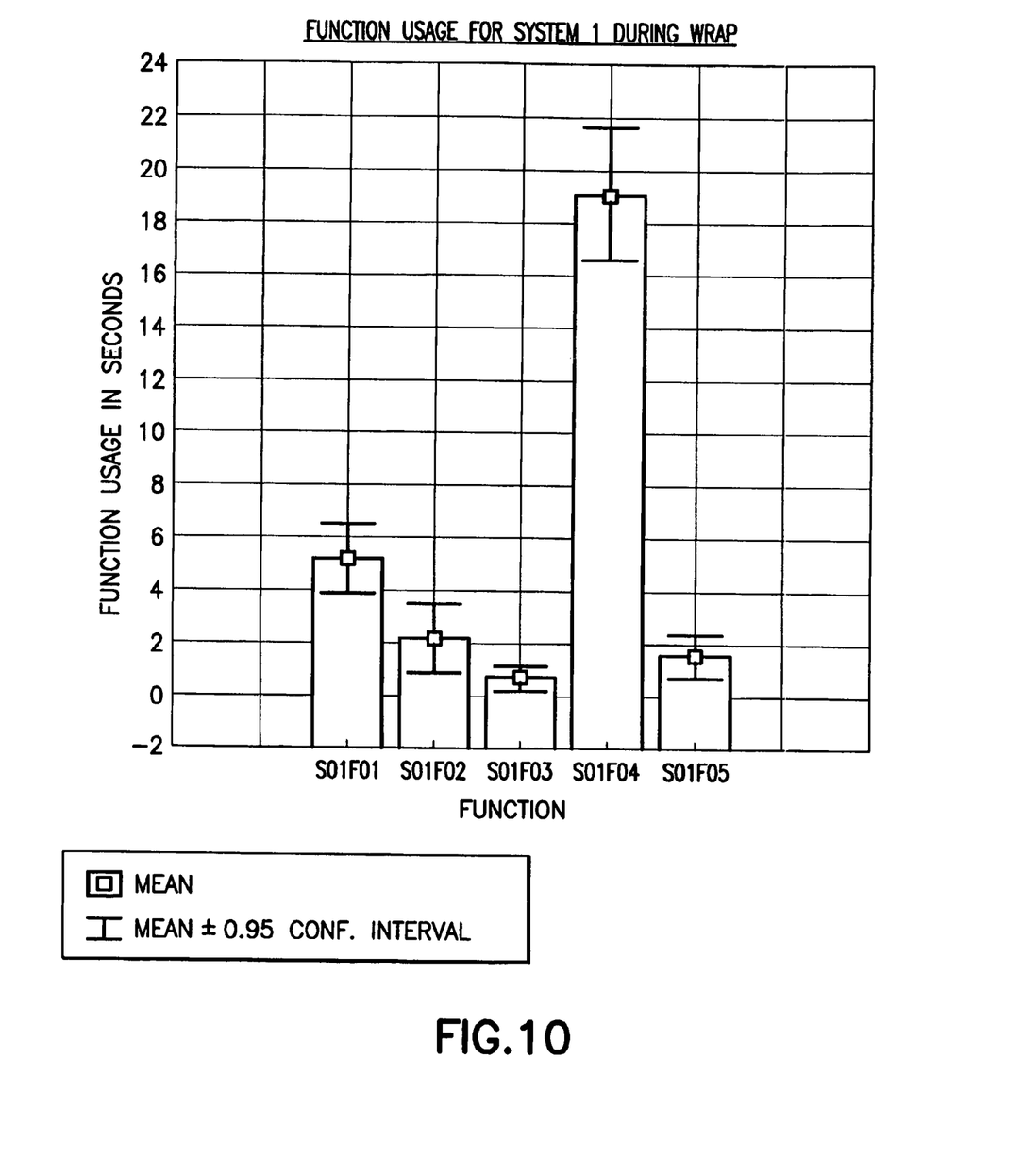
FIG. 10 depicts function usage during wrap time.

In FIG. 10, there is shown an analysis of the use of specific functions during wrap time. Obviously function S01F04 takes more time than all the remaining functions. Efforts directed to reducing the time required in using S01F04 is likely to have the most effect in reducing overall wrap time.

Figure 11:
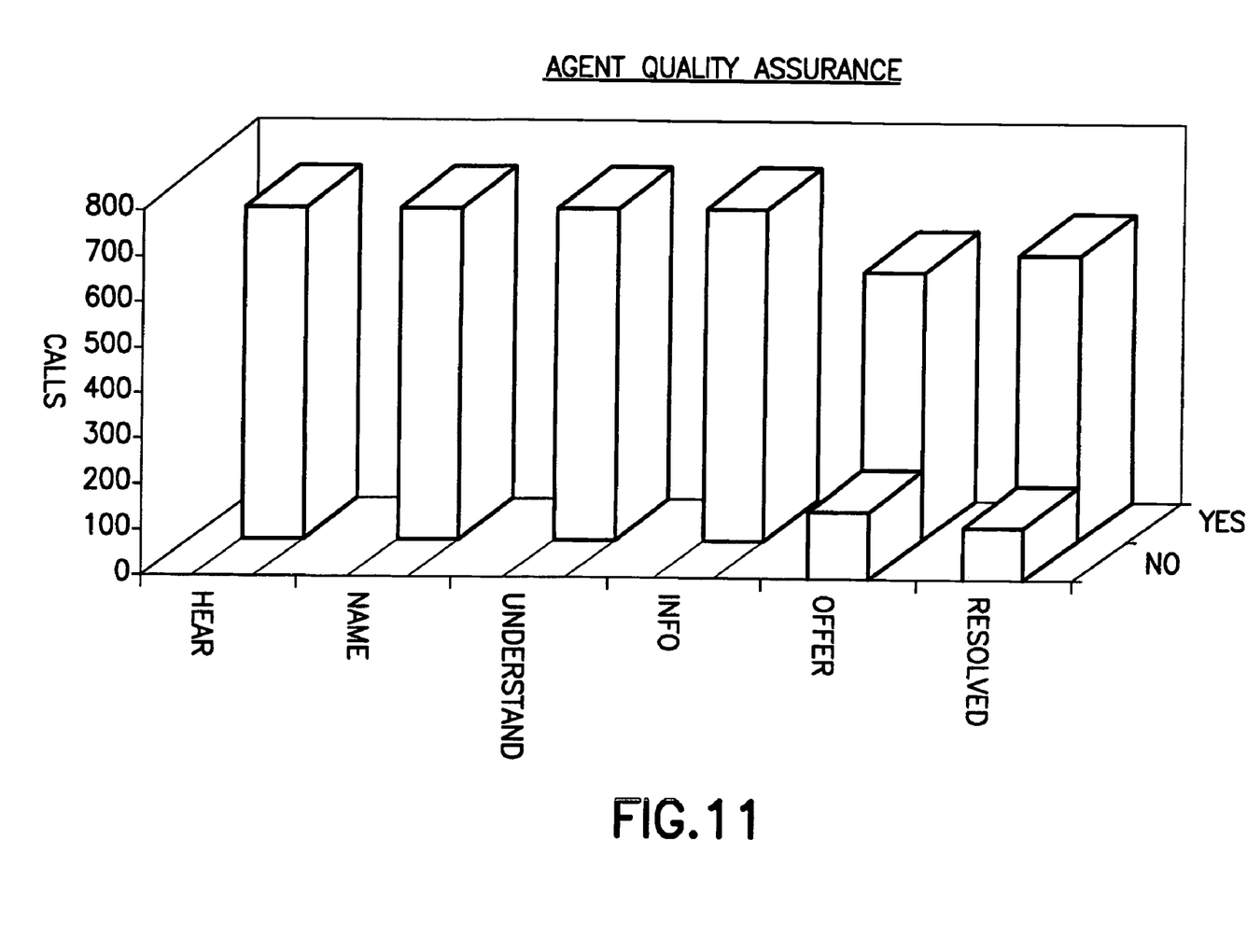
FIG. 11 shows measures of agent quality assurance.

FIG. 11 shows an example of satisfaction analysis of calls. The caller was asked:
- could he hear the call center agent clearly?
- did the agent give his name?
- did the agent understand the problem?
- did the agent provide the information requested?
- did the agent offer to handle other problems?
- did the agent resolve the problem?

The number of calls for which the caller responded yes or no is shown by the vertical bars in FIG. 11. From this call data, improvement efforts can be directed to e.g. increasing emphasis on offering to handle other problems.

Those of ordinary skill in the information technology arts will recognize that standardized statistical packages are available for performing the statistical calculations needed in the analysis step of FIG. 3. Likewise, it will be recognized that other steps in FIG. 3 may be performed with the assistance of computer code methods for capturing data, receiving assignment of code values, assigning calls to reviewers, consolidating data and the like.

While there have been shown and described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A system for conducting a call center study, comprising:
   a tool for capturing call data including time data of a plurality of specific activities from each of a plurality of live calls or recorded calls, by starting a respective timer for each said specific activity, by a person monitoring each said live call or recorded call;
   means for identifying said specific activities applicable to a specific client or study, and assigning code values thereto in said tool;
   means for assigning said calls to a plurality of reviewers;
   means for gathering data from said calls by said plurality of reviewers;
   means for consolidating the gathered data from said plurality of reviewers into a master database;
   means for normalizing said time data in said master database, with agent performance ratings; and
   means for analyzing the normalized time data statistically.

* * * * *